US009886435B2

(12) United States Patent
Veit (10) Patent No.: US 9,886,435 B2
(45) Date of Patent: Feb. 6, 2018

(54) PSEUDO INTERNAL NUMBERING MECHANISM (71) Applicant: Thomas Veit, Kirchheimbolanden (DE)

(72) Inventor: Thomas Veit, Kirchheimbolanden (DE)

(73) Assignee: SAP SE, Walldorf (DE)

( * ) Notice: Subject to any disclaimer, the term of this patent is extended or adjusted under 35 U.S.C. 154(b) by 416 days.

(21) Appl. No.: 14/582,185

(22) Filed: Dec. 24, 2014

(65) Prior Publication Data
US 2016/0188579 A1 Jun. 30, 2016

(51) Int. Cl.
G06F 9/44 (2006.01)
G06F 17/30 (2006.01)

(52) U.S. Cl.
CPC .............. G06F 17/30011 (2013.01)

(58) Field of Classification Search
None
See application file for complete search history.

(56) References Cited

U.S. PATENT DOCUMENTS

| 4,207,814 | A | 6/1980 | Schenk |
| 5,716,469 | A | 2/1998 | Higgins |
| 7,113,656 | B2 | 9/2006 | Jiang |
| 7,433,061 | B2 | 10/2008 | Van De Capelle et al. |
| 7,509,273 | B2 | 3/2009 | Dendl et al. |
| 7,522,046 | B2 | 4/2009 | Decker et al. |
| 7,805,706 | B1 | 9/2010 | Ly et al. |
| 7,844,890 | B2 | 11/2010 | Schmidt |
| 7,882,134 | B2 | 2/2011 | Pattabhi et al. |
| 8,112,401 | B2 | 2/2012 | Blackwood et al. |
| 8,271,498 | B2 | 9/2012 | Fontoura et al. |
| 8,732,083 | B2 * | 5/2014 | Seubert .................. G06Q 20/40 705/26.1 |
| 2006/0294002 | A1 | 12/2006 | Brett |
| 2012/0047079 | A1 | 2/2012 | Biesemann et al. |
| 2012/0179779 | A1 | 7/2012 | Awasthi |

* cited by examiner

Primary Examiner — Chuck Kendall (57) ABSTRACT

Various embodiments of systems and methods to provide pseudo internal numbering for uniquely and continuously numbering of legally bound documents are described herein. In one aspect, an external numbering range object (NRO) is generated in a computer system. The range of numbers assignable by the external NRO is split into a set of intervals based on a prefix. In another aspect, an internal NRO is generated corresponding to a subset of the intervals of the external NRO. The correspondence between the internal NRO and the subset of intervals is determined by a part of the prefix. In yet another aspect, the unique and continuous numbers generated by the internal NRO are correlated with the numbers in the intervals of the subset of intervals of the external NRO based on a correspondence between values of the prefix of the external NRO and a prefix of the internal NRO.

20 Claims, 6 Drawing Sheets

PSEUDO INTERNAL NUMBERING MECHANISM

BACKGROUND

Generally, software systems use unique numbers for identification of particular objects or items, to comply with established rules, e.g., statutory and/or legal requirements. For instance, in various business software systems, the generated documents have to be uniquely numbered, and also the numbers must be continuous without any gaps or not-used numbers. Examples of such documents may include different types of logistic documents, e.g., sales orders, delivery and billing documents. Typically, the numbering of documents of different types is provided within a common number range. Such a common number range can be divided into several number range intervals, which can be used, e.g., to distinguish between the different types of documents.

Figure 1:
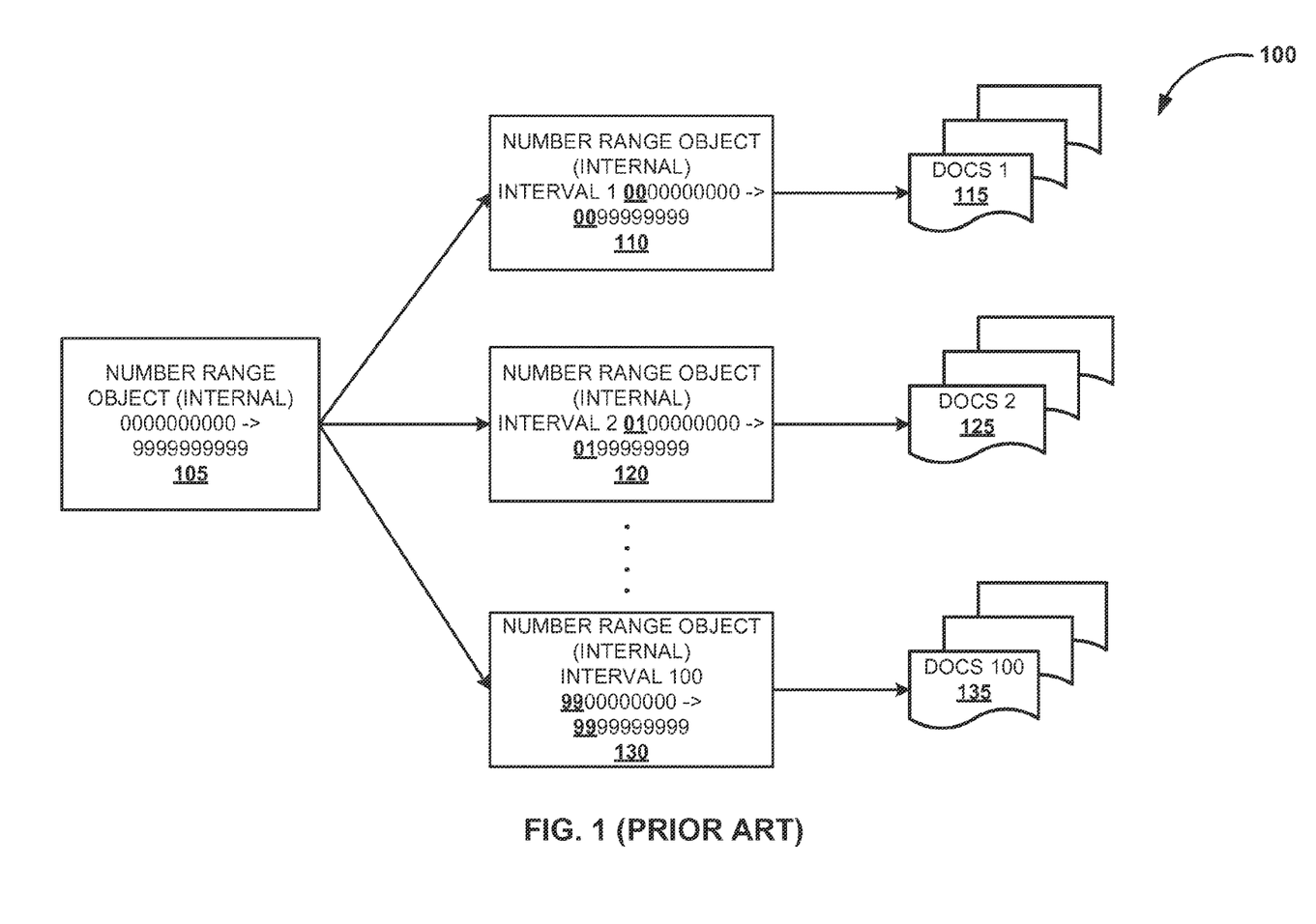
FIG. 1 is a block diagram illustrating model 100 for uniquely and continuous numbering of legally bound documents.

FIG. 1 illustrates an example of a common scenario (100) for uniquely and subsequently numbering of documents of different types in a software system. Usually, the software systems define one or more internal numbering objects to provide subsequent numbers within a range of predefined length upon request. Number range object (NRO) 105 is an example numbering object providing subsequent numerical numbers between '0000000000' and '9999999999'. The illustrated number range has length of ten digits or positions, as this is a typical requirement for numbering legally bound documents (herein also called 'legal documents'), but other lengths are also possible depending on the definition of the NRO 105. As illustrated in FIG. 1, the number range of NRO 105 is split into one hundred intervals, e.g., NRO interval 1 (110) to NRO interval 100 (130). The separate intervals may be assigned to separate document types and/or to separate partners. Respectively, the subsequent numbering of different types of documents, e.g., docs 1 (115) to docs 100 (135) could be provided within corresponding separate intervals. The number and the length of the separate intervals may be determined by a prefix with predefined length. In the illustrated example, the first two digits of the number range of the NRO 105 are used as a prefix to split the range into 100 (e.g., $10^2$) intervals.

Technically, the available numbers are limited, since the number field for the legal documents is defined with a particular length (e.g., ten characters). Also, the number of number range intervals is limited, e.g., by the length of the prefix. Therefore, for some business areas, this restriction in the numbering ranges can be problematic.

For example, in wholesale or consumer products a company may map its own business into an Enterprise Resource Planning (ERP) system, and in addition to that, the business processes of collaborative partners, which are, e.g., taking care of specific follow-on processes. In some cases, these partners may even have access to the system and may be allowed to create and change logistic documents within their own area of accountability. One such example is the handling of so-called distributors, which are usually mapped as own company codes. Thus, the numbering of the billing documents (e.g. invoices, customer notifications, etc.), which have a direct link to financials, may require individual number range intervals per distributor to guarantee a subsequent numbering without any not-used numbers for each distributor. However, such a requirement may lead to a severe problem for providing numbers for the documents. For large companies, a common scenario is having at least several thousand distributors generating several hundred thousand invoices (or more) per year. The billing process of these distributors may also require different types of billing documents, e.g., at least three different types of legal binding documents may be used—invoices, customer notifications, debit notes, etc. For such a volume, the sole usage of number range intervals of an internal NRO will obviously not be sufficient. For example, the available (internal) numbers for billing documents only provide up to 10 billion numbers. On the other hand the numbers needed for a runtime of 10 years of such a company could roughly be estimated to 75 billion (e.g. multiplying 5,000 distributors, three of billing type documents, 500,000 of documents per type per year for the next 10 years).

A simple technical extension of the number range is not easy to achieve, because this would lead to an adaption of a large number of coding with a high risk for new errors.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for pseudo internal numbering are described herein to guarantee the generation of enhanced range of unique and subsequent numbers. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Typically, the unique and subsequent numbering, e.g., of legal documents, in a software system or application is provided by internal NROs. An internal NRO is used to indicate that the consequent numbers are automatically generated by the system. In addition to the internal NROs, external NROs could be also defined and generated. The numbers provided by the external NROs are separately. e.g., manually, assigned to the external NROs, hence, there is no built-in control for uniqueness and continuity. To comply with more stringent numbering requirements, the internal NROs may be defined to generate only numbers including only numeric symbols (e.g., '0' to '9'). Such a restriction may not be necessary for the external NROs, and they can assign numbers including other symbols, e.g., alpha-numeric ('0'-'9', 'A'-'Z'), as well as some special symbols. Thus, the number range with the same length generated by an external NRO could be significantly bigger than the number range generated by an internal NRO. In one embodiment, an external NRO is used for automatically generating unique and subsequent numbers in a pseudo internal numbering manner. In this document such combinations of numeric and non-numeric symbols are also called numbers, and the requirements for uniqueness and continuity are applicable.

Figure 2:
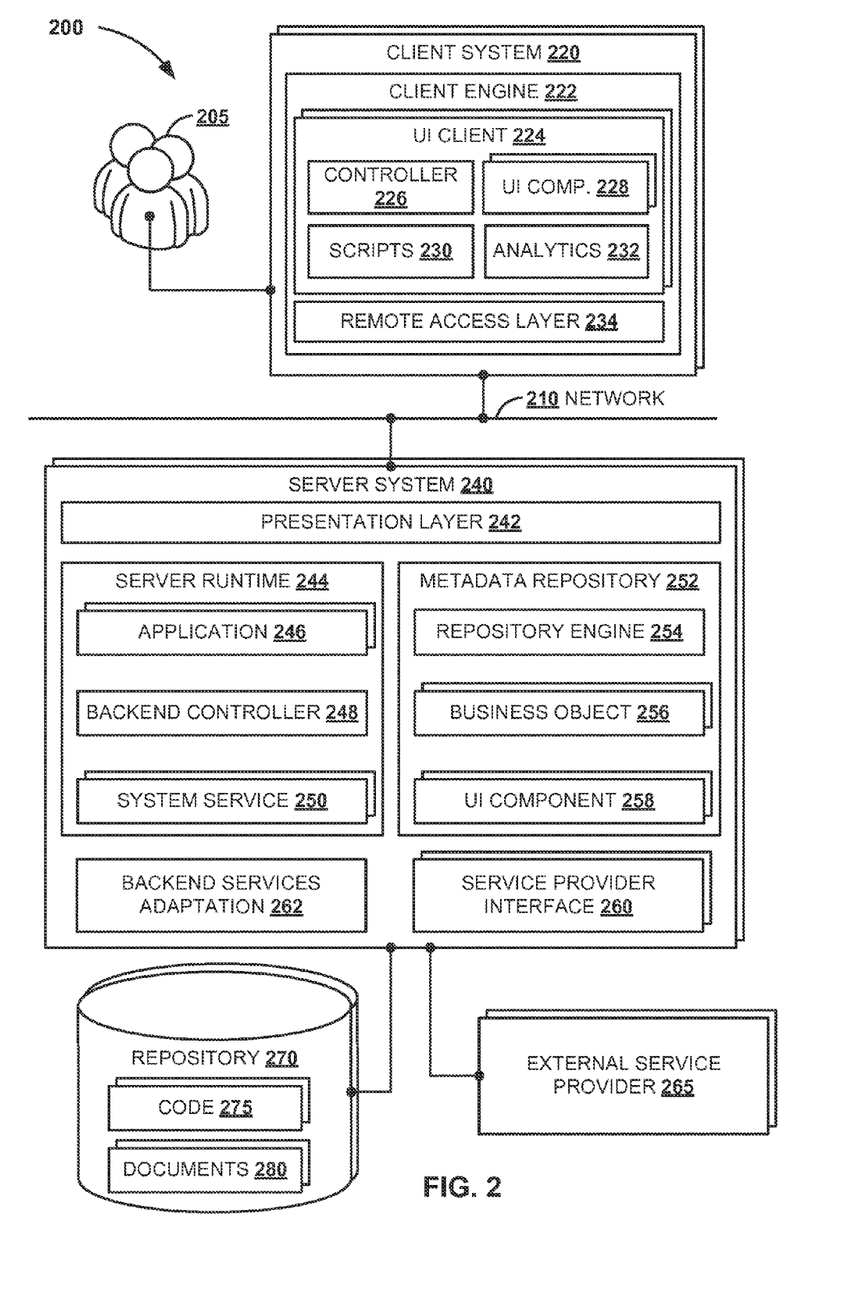
FIG. 2 is a block diagram illustrating computer system landscape 200 implementing pseudo internal numbering, according to one embodiment.

FIG. 2 is a block diagram showing computer system landscape 200 where pseudo internal numbering is implemented for distributed systems, according to one embodiment. The computer system landscape 200 includes a rather simplified example of classic client-server architecture. One or more shareholders or users 205 operate on one or more client systems 220. Users 205 may request different services or execute various operations available within client systems 220, or provided by one or more server systems 240 via network 210. The illustrated server systems 240 represent one or more backend nodes in the computer system landscape 200. The requested services may involve the generation of various types of statutory or legal documents (e.g., billing documents, invoices, purchase orders, etc.) that require to be uniquely numbered for the separate users 205 and/or the separate client systems 220.

The client systems 220 and the server system nodes 240 communicating via network 210 may define a number of different computer system environments. Some of the elements of the computer system landscape 200 resemble the structure and functionality of software modules developed by SAP AG. However, structures with similar functionalities could be found in software products developed by other vendors, as well. Alternative embodiments may utilize other kinds of computer system architectures.

The involved client systems 220 may have similar or different structures where one or more of the illustrated modules are replicated. One or more users 205 may operate within one or more instances of user interface (UI) client 224 of one or more of client systems 220. Different users 205 may exclusively access different instances of the UI client 224 within a same client system 220.

In one embodiment, some of client systems 220 may execute a standalone client application, e.g., client engine 222, to interact with the backend server system 240. Alternatively, an intermediate layer may be downloaded to some of the client systems 220 as an extension of a running Internet browser. Such intermediate layer may be also illustrated as client engine 222. The standalone client application and the intermediate layer may have similar components and functionality. Client engine 222 may handle the rendering of the necessary client functionality, and also the communication with server systems 240 via network 210, when necessary.

The client engine 222 includes UI client instances or sessions 224 that may also embed into a browser integrated framework. The UI client 224 may be a part of a browser integrated framework, e.g. Silverlight® provided by Microsoft Corp, Flex® provided by Adobe Systems Inc., JavaFX® originally developed by Sun Microsystems Inc., etc. In one embodiment, the client engine 222 and UI client 224, respectively, may be desktop application, for example, a .NET® application rendering a UI through a Windows Prosecution Foundation (WPF) system. The UI client 224 accesses the necessary business data at the backend 240, e.g., through remote access layer 234 via network 210. In one embodiment, no dedicated UI server or client programs are needed. The communication with the backend 240 may include extracting, storing and updating data. The data may be transported to repositories 270, especially when backend 240 implements a number of server nodes in separate computer system environments.

In one embodiment, users 205 generate services requests at UI client 224. UI components module 228 instantiates one or more appropriate graphical user interface (GUI) screens or controls in response to the user requests. The behavior of the UI components is managed by controller 226. The controller 226 may ensure that the instantiated controls in the UI components 228 are initialized. The controller may be also responsible for the execution of any configured operation triggered by events corresponding to the instantiated controls. In case when some of the operations involve execution of script segments, the controller 226 may trigger the execution of these scripts via scripts module 230. In one embodiment, scripts module 230 is a frontend scripting engine. Analytics module 232 may be used for frontend data processing when necessary.

In one embodiment, the backend 240 utilizes presentation layer 242 to connect to the Internet and/or to other public or private networks, and to provide access for the UI client sessions 224 to underlying business functions and data structures. For example, the presentation layer 242 may generate the UI object model underlying the UI controls instantiated in the UI components module 228 at the client systems 220. In one embodiment, presentation layer 242 may be part of the server runtime 244.

The server runtime 244 provides environment where one or more software applications 246 are executed. For example, the applications 246 may provide a number of business services for the users 205, where various operation requests related to the business services are created at client systems 220. The requests are translated to corresponding process tasks performed by the applications 246 executed in server runtime 244. Applications 246 may request unique and continuous numbers from an internal NRO instantiated and executed in the runtime 244. The generated chains of numbers may be divided in separate intervals and assigned to corresponding types of documents. Thus, one NRO may provide unique numbering for multiple types of legal documents per multiple entities (partners). In one embodiment, the unique and subsequent numbers may be generated by a number of internal NROs and assigned by an external NRO instantiated in the runtime environment 244, to provide additional numbering space and guaranteeing the uniqueness and continuity by applying pseudo internal numbering mechanism. The mechanism itself can be implemented as a customer specific plug-in to the existing applications. Typically, the software system vendors provide techniques to plug-in additional program logic when required, e.g., for specific business needs, without disrupting the existing installations. For example, SAP AG provides a technique called Business Add-In (BAdI) to enhance the existing SAP system functionalities to accommodate specific customer requirements. Such techniques could be used to implement the pseudo internal numbering mechanism.

In one embodiment, the server runtime 244 includes backend controller 248 for one or more UI client sessions 224 to handle the requested UI components, e.g., when a UI client session 224 triggers an initialization of a UI component for the first time. The backend controller 248 may manage the collaboration between the requested UI components and one or more underlying business objects. System services 250 in the server runtime 244 may be used to administer the characteristics of the server runtime 244, e.g., its engine parameters, the user access to one or more components, the processes execution, the communication with other runtime environments, like, external systems, databases, etc. In one embodiment, system services 250 may also provide deployment, setup and change management of software components.

Metadata repository 252 is generally the place where metadata about the computer programs deployed in the server system 240 are preserved, according to one embodiment. There are different kinds of metadata that could be maintained by the metadata repository 252. For example, the repository 252 keeps the description of the business objects 256 underlying the applications 246. In one embodiment, metadata repository 252 keeps description of the available UI components 258 and the relationships between them as designed. In one embodiment, the definitions of a BAdI implementing the pseudo numbering mechanism could be stored in the metadata repository 252.

Repository engine 254 manages the metadata and the collaboration with the server runtime 244 at one side, and with various service providers 265 at another side. The service providers 265 may render services and/or corresponding UT components to the backend 240 as defined in the metadata. The service providers 265 are available via service provider interfaces 260, and can be either internal or external to the backend 240. In one embodiment, backend services adaptation 262 represents a layer that helps to adjust the designed UI or rendered UI components to a set of normalized business objects available at the server system 240. In one embodiment, the pseudo internal numbering mechanism could be implemented and provided at the backend 240 as an external service.

In a multi server system environment, e.g., in a cluster of more than one server system nodes 240, repository 270 may be used to persist different kinds of common data, including programming code, business data, metadata, etc. In one embodiment, one or more different repositories 270 may be assigned to different computer system environments defined in the computer system landscape 200

In one embodiment, users 205 may design, create or change a program component, a data object or some other type of computer system artifact by manipulating UI components 228 associated with particular application or software tool. The UI components 228 may be available within GUI environment of the UI client 224. The manipulations of the UI components 228 may trigger execution of various system or application procedures in server runtime 244. Further, the manipulations of the UI components 228 may lead to changes in the metadata repository 252, e.g., changes in the definitions of the UI components 258, even to changes in the descriptions of the business objects 256, etc.

For example, by manipulating UI components 228 or by directly entering program code, a user 205 may create a BAdI artifact in development computer system environment defined in the landscape 200. The BAdI could be stored as artifact among other artifacts 275 in repository 270. Another user 205 may perform tests with the created BAdI to prove its quality. Typically, such tests are performed in a separate environment defined in computer system landscape 200. The different environments in the landscape 200 could be logically and even physically isolated, where each computer system environment may encompass separate server system nodes 240 different repositories 270 and even different client systems 220.

In one embodiment, the BAdI artifact may have to be transported from the computer system environment where it was created to the computer system environment where it will be tested. The transportation may be requested by a user 205 through a client system 220 and executed by an application 246, a system service 250 or by external service provider 265. The transportation of the BAdI artifact may involve a transfer between different repositories 270. Once received in the testing environment, the BI Report artifact may need to be updated, e.g., to be connected to different applications that are available in the testing computer system environment. Such an update may also be performed by a user 205 by manipulating UI components 228. Alternatively, the transported artifacts and/or applications may be updated automatically by an application 246, system server 250 or by a service provider 265 in the receiving computer system environment, according to one embodiment.

In one embodiment, in a productive computer system environment, the generated business documents with assigned unique and continuous numbers may be also stored in repository 270, e.g., documents 280.

Figure 3:
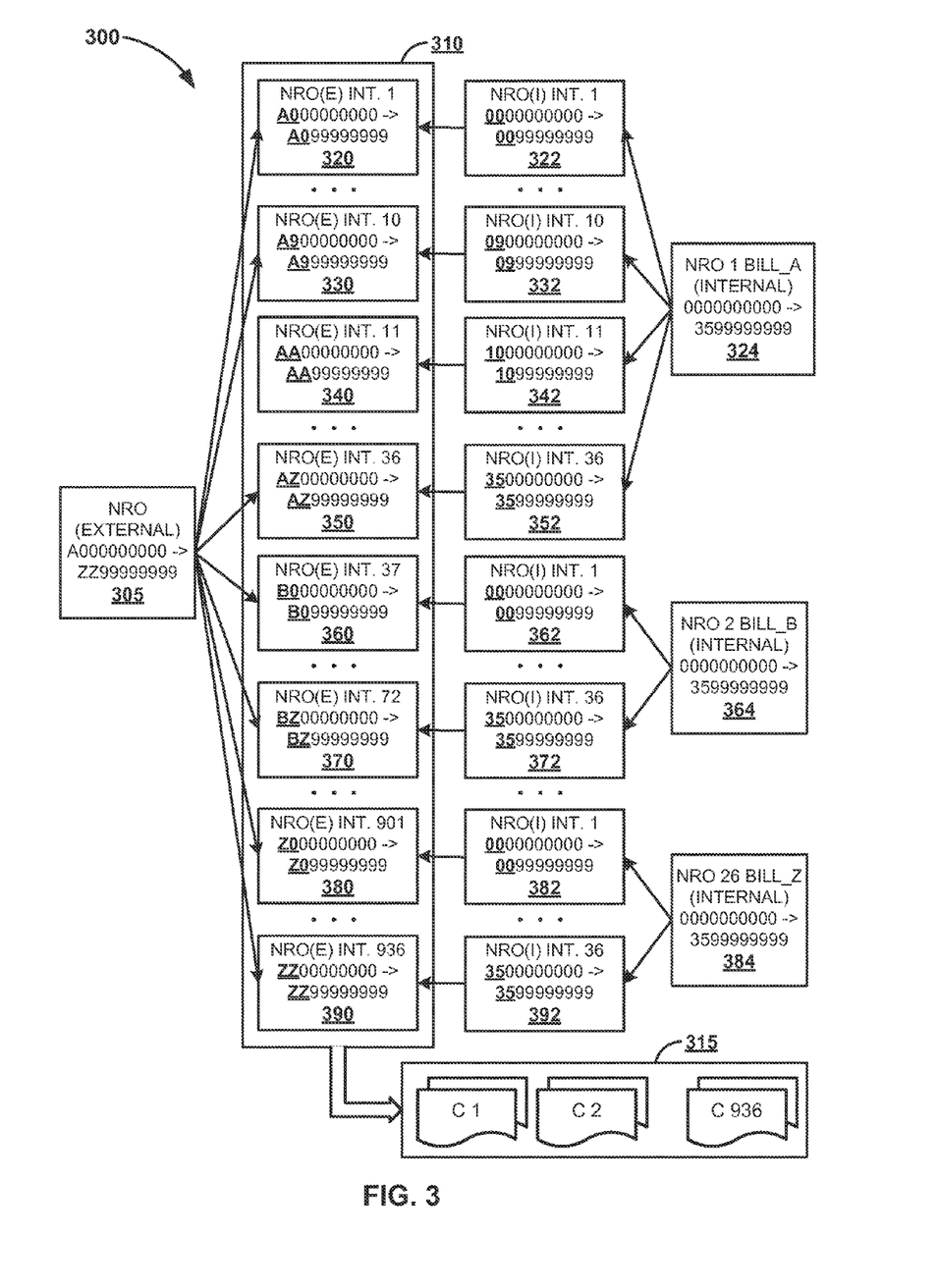
FIG. 3 is a block diagram illustrating model 300 of pseudo internal numbering, according to one embodiment.

FIG. 3 shows model 300 of pseudo internal numbering using an external NRO, according to one embodiment. The advantage of using external NROs instead of internal is that they allow using non-numerical characters in addition to the numerical characters. Thus, assuming that 26 alphabetical characters are added, a space of 36 characters (10 numbers+ 26 letters) could be leveraged. However, the implementation needs to guarantee that the generated or assigned numbers in the thus extended number range will be still unique and continuous. The length of the prefix used for splitting the number range to intervals, affects the size of the intervals, and respectively the possible volume of documents of particular type or for particular entity (e.g., department, partner, client, etc.) to be generated. The illustrated model 300 is based on external NRO 305 of which 936 intervals are generated by adding letters to the numeric characters used in the prefix to split the total range, while keeping only numeric symbols for the body of the generated numbers. Thus, compared to the internal NRO, 836 more intervals of the same size could be generated. The generated intervals are illustrated in FIG. 3 with NRO external (E) interval 1 (320) to NRO (E) interval 936 (390).

In one embodiment, the prefix of the number range in FIG. 3 is formed by the first two characters, and to each prefix value corresponds a separate number range interval. In the illustrated example, the adopted convention is to use only alphabetical characters for the first portion or position of the prefix ('A'-'Z'), and alpha-numeric characters for the second portion (e.g., position) of the prefix ('0'-'9', and 'A'-'Z'). For example, this convention could help when the pseudo internal numbering mechanism is implemented after the available number ranges provided by an internal NRO are exhausted, but their uniqueness has to be preserved. Thus, the number range intervals of the external NRO could be grouped in 26 subsets corresponding to the value of the first portion of the prefix.

In one embodiment, up to 26 internal NROs are generated, able to create 10 digit number ranges. Each of the generated NROs is assigned to a separate subset of the external NRO intervals. These internal NROs can be organized e.g. by using the distinguishing first character of the prefix of the corresponding subset of intervals as postfix, e.g. 'BILL_A' (324), 'BILL_B' (364), . . . 'BILL_Z' (384). For each of these internal NROs, 36 internal number range intervals may be defined, e.g., NRO internal (I) interval 1 (322)-NRO (I) interval 10 (332), NRO (1) interval 11 (342) and NRO (I) interval 36 (352) for the internal NRO 'BILL_A' (324); NRO (I) interval 1 (362) to NRO (I) interval 36 (372) for NRO 'BILL_B' (364), and NRO (I) interval 1 (382) to NRO (I) interval 36 (392) for NRO 'BILL_Z' (384). The number of the intervals may be determined by a prefix of the first two positions of the corresponding numbers. In one embodiment, the value of this prefix may correspond to the order of the character in the second portion of the prefix of the external NRO numbers, e.g., '0' corresponds to '00', '9' to '09', 'A' to '10' and 'Z' to '35'.

In one embodiment, the intervals 310 of the external NRO 305, and respectively, the generated numbers in these intervals could be correlated with the intervals and numbers of the internal NROs (324, 364 and 384) based on the values of the prefixes. Thus, for example, the NRO (E) interval 72 (370) with prefix 'BZ' is correlated with NRO (I) interval 36 (372) of internal NRO 2 (364) corresponding to the value 'B' of the first portion of the prefix (e.g., and named 'BILL_B'). Further, the value 'Z' of the second portion of the NRO (E) interval 1 (370) corresponds to value '35' of the prefix of the NRO (I) interval 36 (372). The correlation between the intervals enables to generate a unique subsequent number, when requested, by using the internal NROs 324, 364 and 384, accordingly, and assign the body of the generated number to the body of the corresponding number of the correlated interval of the external NRO. Thus, the body of a generated subsequent number will be the same, but the numeric prefix assigned by the respective internal NRO (324, 364 or 384) will be replaced with the corresponding alpha-numeric prefix of the external NRO 305. The numbers generated this way are assigned to the documents 315, e.g., to the entity (types of documents, partners, etc.) corresponding to the respective number range interval among the intervals 310.

Table 1 is a mapping table that could be used in the implementation of model 300, according to one embodiment. The starting point is the determination of the right external number range interval of the external NRO 305. For example, to each partner, sales organization, type of document, and/or other entity, according to the business process, an external number range is uniquely assigned, and this assignment is provided in the mapping table (e.g., table 1). As it was explained, the internal and external intervals are determined by their prefixes.

TABLE 1

| Entity (company code) | External NRO interval prefix | Internal NRO | Internal NRO interval prefix |
|---|---|---|---|
| '0001' | 'A0' | 'BILL_A' | '00' |
| . . . | | | |
| '000Z' | 'AZ' | 'BILL_A' | '35' |
| '0010' | 'B0' | 'BILL_B' | '00' |
| . . . | | | |

When a new document number is requested, first, the requesting partner or corresponding external number range interval is identified. For example, in table 1, if partner with company code '000Z' requests a unique number for generating a new document, the external NRO interval is identified by the prefix 'AZ' corresponding to company code '000Z' in the mapping table. Then, based on the first portion of the prefix, the corresponding internal NRO is determined, e.g., the NRO 1 'BILL_A' (324). Further, the correct internal NRO interval is determined as '35' based on the second portion of the prefix of the external NRO interval assigned to the requesting entity (e.g., 'Z'). In one embodiment, the name of the corresponding internal NRO and interval could be directly delivered from the mapping table once created based on the defined correspondences.

In other words, when entity '000Z' requests a next unique and continuous number, the corresponding external NRO interval 36 (350) and its correlated internal NRO interval 36 (352) of internal NRO 324 are determined based on the mapping table 1. For example, a method provided in the software system for generating subsequent number is called for the determined internal NRO (324) and the right internal number range interval (352) (e.g., function 'NUMBER_GET_NEXT(<object>, <interval>)' is called). The actual document number is created by taking the first two digits from the external number range interval (the prefix of the external NRO interval 350), and by taking the last 8 digits of the 10 digit running number returned by the method (the body of the number generated within the internal NRO interval 352).

According to model 300, numbers that are unique and subsequent within the separate intervals and having 2-character prefix and an 8-digit subsequent number without any gaps or not-used numbers could be generated. This leads to 936 possible number range intervals, where each interval contains 99,999,999 possible numbers, based on the adopted convention. The volume of possible number range intervals can be extended further by also using special signs. If consider adding the most common special signs such as '!', '"', '§', '$', '%', '&', '/', '(', ')', '=', '?', '{', '}', '[', ']', '*', '+', '−', '~', '<', '>', ';', ':', '#', this could lead to around 3,000 possible number range intervals. However, this would require generating more new internal NROs corresponding to the internal numbers, and the mapping table may be more complex. In one embodiment, the implementation of the model 300 may be customer specific, and could be placed in an external add-in of an existing business software system, e.g., to a new BAdI.

Figure 4:
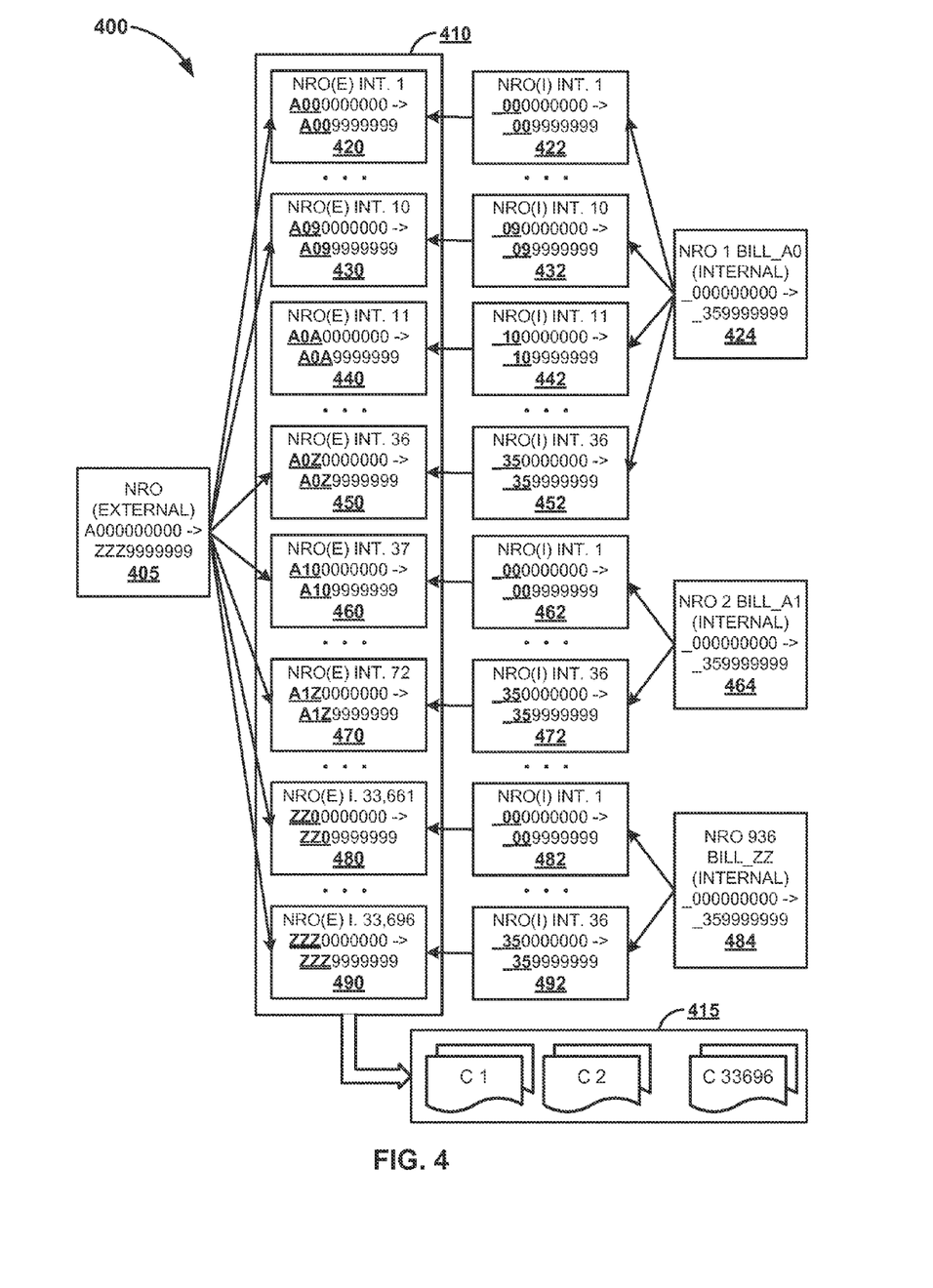
FIG. 4 is a block diagram illustrating model 400 of pseudo internal numbering, according to one embodiment.

FIG. 4 shows model 400 of pseudo internal numbering with using an external NRO, that enables generating additional intervals of subsequent numbers by using alpha-numeric values ('0'-'9', and 'A'-'Z'), according to one embodiment. Compared to model 300, model 400 adds one character to the prefix and respectively takes one character from the body of the numbers to keep a combined length of ten positions. As FIG. 4 illustrates, external NRO 405 for the pseudo internal numbering is generated. The number range of the external NRO 405 is from 'A000000000' to 'ZZZ0000000'. Thus, stepping on the three symbol prefix, the number range of the NRO 405 could be split to a total of 33,696 intervals 410. Similarly to model 300, the intervals 410 of the external NRO 405 could be grouped in subsets based on a first portion of the prefix. In this example, the first portion of the prefix includes two characters. Based on the adopted convention (which may be of illustrative purposes only, and different conventions could be applied), the first character of the first portion of the prefix may be only alphabetical symbol (e.g., 'A'-'Z'), and the second character could be alpha-numeric symbol (e.g., '0'-'9', and 'A'-'Z'). Thus, the total number of the subsets is 936 (26*36).

In one embodiment, for each such subset of intervals of the external NRO 405, a separate corresponding internal NRO may be created, e.g., internal NRO 1 (424), internal NRO 2 (464), to internal NRO 936 (484), and named, for example, to include the symbols of the corresponding external intervals subsets, e.g., 'BILL_A0' to 'BILL_ZZ'. The actual volume of generated internal NROs cold depend on the necessity for numbering intervals (e.g., the number of partners or entities, and the type of documents per partner/entity). In contrast to model 300, in model 400 the internal NROs (424, 464 and 484) generate numbers with length of nine positions, to account for the decreased body length of the numbers of the external NRO 405. The length of the prefix of the numbers of the internal NROs remains two characters, but the body also decreases with one character to allow for correlating the number ranges in an internal NRO (424, 464 or 484) with the number ranges of the external NRO 405 of the corresponding subset. The correlation between a particular numeric interval of the internal NRO (424, 464 or 484) and a particular alpha-numerical interval of the corresponding subset of intervals of the external NRO 405 may be determined by the two digit prefix of the internal interval and the last symbol of the three symbol prefix of the external interval. Thus, the external intervals 420, 430, 440, 450, 460, 470, 480 and 490 correspond to the internal intervals 422, 432, 442, 452, 462, 472, 482 and 492, respectively, as illustrated in FIG. 4.

Table 2 shows an illustrative example of a mapping table provided to reflect the correspondence between the interval subsets and the generated internal NROs, helping to implement the model 400:

TABLE 2

| Company Code | External number range interval | Virtual number range interval | Level 2 internal NRO | Level 2 number range interval |
|---|---|---|---|---|
| 0000 | A0 | A00 | BILL_A0 | 00 |
| 0001 | A0 | A01 | BILL_A0 | 01 |
| ... | | | | |
| 000Z | A0 | A0Z | BILL_A0 | 35 |
| 0010 | A1 | A10 | BILL_A1 | 00 |
| ... | | | | |
| 001Z | A1 | A1Z | BILL_A1 | 35 |
| ... | | | | |

This combined set-up of the original (external) NRO (405) with external number range intervals and new level-2 (internal) NROs with internal number range intervals is used to determine the actual document number, when a legal or statutory regulated document is created. The logic needed in this process includes reading the mapping table (e.g., table 2) by using a current legal entity, e.g. the company code. Thus, the right external number range interval of the original NRO is identified, and also the virtual number range interval (e.g., the full prefix of the numbers of the external or original NRO) would be identified. For example, company code 001Z leads to external number range interval subset A1 (the first part of the prefix) and to virtual number range interval A1Z (the full prefix). The mapping table helps also identify the right internal NRO and the right internal number range interval (e.g., the last two columns). For example, company code '001Z' leads to NRO 'BILL_A1' and internal interval of '35'.

A method (e.g. a function such as 'NUMBER_GET_NEXT') may be called after checking the mapping table, for the determined NRO and the internal number range interval. In return, a nine digit number is generated, where the first two digits are identical to the internal number range interval and the following seven digits are a running number, e.g., the next continuous number. This seven digit running number is needed to complement the already known three character prefix to generate the unique and continuous external number to be assigned to the next legal document for the requesting entity of the corresponding type (e.g., determined by the company code). For above example, the returned nine digit number may be '350000122', the 7 digit number is '0000122', and accordingly, the unique subsequent pseudo-internal number is 'A1Z0000122' to be assigned to the next of the documents 415, accordingly.

In other words, the actual billing document number is created as a combination between the first three digits or characters of the virtual number range interval, and the last seven digits of the number automatically generated by the corresponding internal NRO upon request. As shown, the proposed model 400 allows generation of billing numbers having 3 character prefix and a 7 digit subsequent number without any not-used numbers. This leads to 33,696 (e.g., 26*36*36) possible virtual number range intervals, where each virtual interval contains 9,999,999 possible numbers (if zero is not used as a valid document number). The number of intervals could be further increased by using additional symbols, but the model guarantees the uniqueness and continuity.

Figure 5:
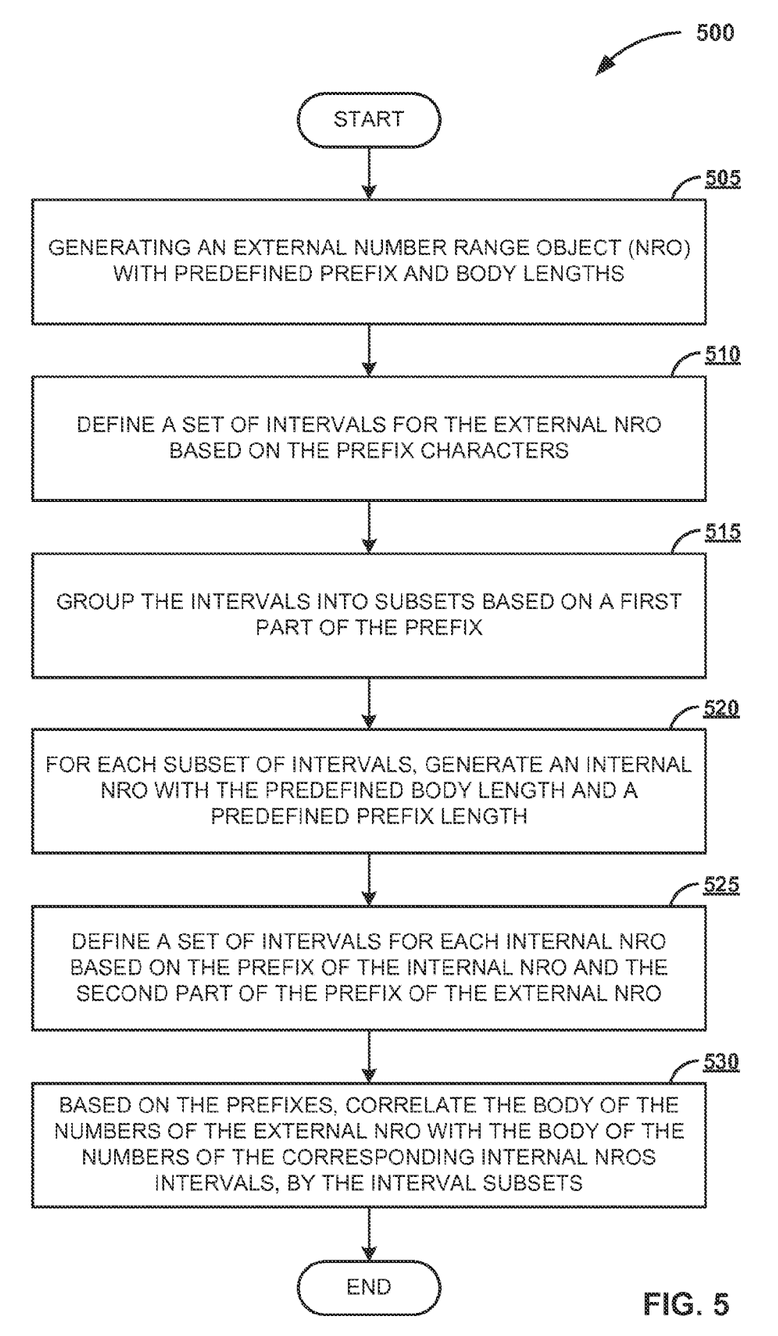
FIG. 5 is a flow diagram illustrating process 500 to apply pseudo internal numbering models, according to one embodiment.

The logic of the pseudo internal numbering described in the context of models 300 and 400 is summarized in process 500 shown in FIG. 5, according to one embodiment. Initially, at 505, an external NRO is generated with predefined prefix and body lengths. The prefix and body lengths are virtual split of the character positions of the numbers, for the purposes of the implementation of the models. The external NROs, in contrast to the internal NROs allow using characters different than numerical. However, the external NROs also allow assigning manually numbers for the legal documents, without providing mechanism to guarantee that the numbering is unique and continuous. The internal NROs have such mechanism, and therefore, the combination between the two allows generation of extended number ranges guaranteeing unique and continuous numbering without additional development to change the behavior of the number range objects.

In fact also combinations of the models 300 and 400 are possible, e.g. to account for few large distributors, which will probably need more numbers over time (model 300) and a large number of small distributors, which will probably need less numbers over time (model 400).

At 510, a set of intervals for the generated external NRO is defined based on the different combinations between the possible prefix characters. Thus, depending on the allowed characters and the length of the prefix different volumes of intervals would be possible. The reason for splitting the complete number range into different intervals is to have a parallel series of continuous unique numbers to be used for different types of legal documents and/or for different entities associated with the different documents, e.g., billing documents, sales orders, invoices, etc. per different partners. Thus, for each partner and for each type of legal document a separate number series could be generated, e.g., from the associated number range intervals.

Next, at 515, the generated intervals could be grouped into subsets based on a first part or portion of the prefix. The first part of the prefix may be determined by the first one or more character positions of the prefix. The size of the first part of the prefix determines the number of the subsets. In model 300, the size of this first part is one character that allows only alphabetical characters, and thus the number of subsets is 26. Respectively, in model 400 the length of the first part of the prefix is 2 positions, and the number of characters is 936, as was shown. The size of the second part of the prefix, according to models 300 and 400 is one position, but there may be embodiments with bigger second part of the prefix, where different character combinations could be used to further extend the number of intervals.

At 520, for each subset of the intervals, an internal NRO could be generated. The internal NRO's could be generated initially, at the initialization of the implementation of the pseudo internal numbering mechanism, and be available to be requested, or a new internal NRO based on the model could be generated when the number ranges of the previous subsets are depleted. The numbers generated by the internal NROs could also be virtually or logically divided to prefix and body, where the body has the same length as the body of the numbers assigned to the generated external NRO, according to one embodiment. The length of the prefix of the numbers generated by the internal NROs is usually pre-defined or fixed to two, to reflect the volume of possible symbols (and combination of symbols, if necessary) used in the second portion of the prefix of the numbers assigned to the external NRO (e.g., 36 alpha-numeric symbols). Thus, for model 300 the internal NROs may generate up to 10,000,000,000 unique numbers (2-digit prefix and 8-digit body), while for model 400 this volume is limited to 1,000,000,000 (2-digit prefix and 7-digit body).

At 525, a set of intervals for each generated internal NRO is defined based on the prefix of the internal NRO and the second part of the prefix of the external NRO. Where, the second part of the prefix of the external NRO limits the number of intervals, and the values or the prefix of the internal NRO correspond to the values of the second part of the prefix of the external NRO. Based on such correspondence between the prefixes, the number intervals of the internal NROs and the number intervals of the external NRO distributed by subsets corresponding to the generated internal NROs could be correlated (530). Respectively, the bodies of the numbers generated in the internal NROs are correlated with the bodies of the corresponding numbers of the external NRO. Thus, the unique and subsequent numbers assigned to the legal documents by using external NRO are generated by internal NROs, e.g., based on the demonstrated models (300 and 400), to guarantee compliance with the legal requirements for uniqueness and continuity.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
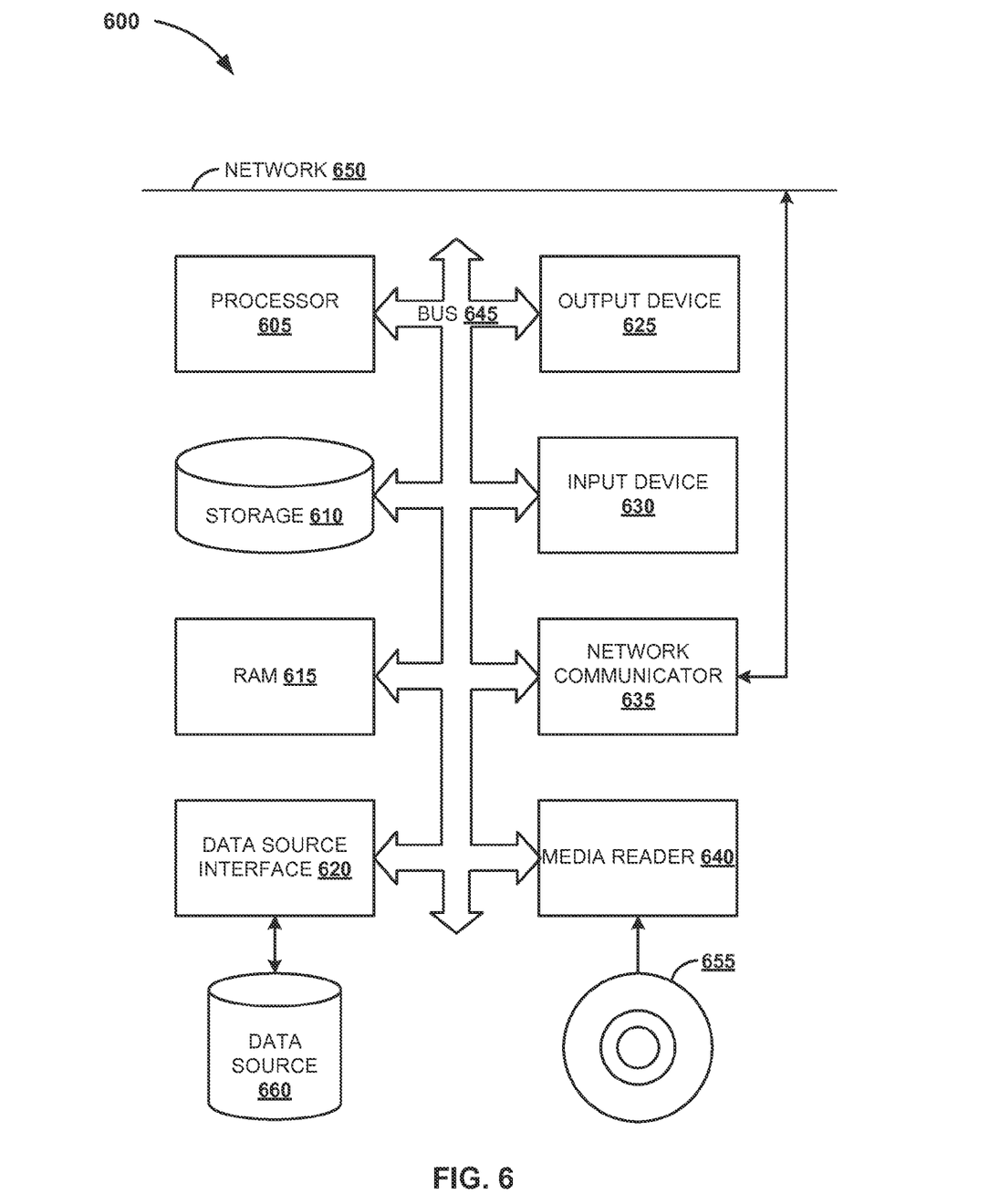
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system to implement pseudo internal numbering mechanism for unique and continuous numbering of documents generated in a software application, the system comprising:
    a memory to store executable instructions; and
    a processor coupled to the memory to execute the instructions to:
        generate an external number range object (NRO) to assign numbers to the documents, wherein each number associated with the external NRO is logically split to a prefix and a body of the external NRO with predefined lengths;
        define a set of intervals of numbers associate-able with the external NRO, based on possible combination of characters in the prefix of the external NRO;
        group the set of intervals into subsets of intervals of the external NRO, based on possible combinations of characters in a first part of the prefix of the external NRO;
        generate an internal NRO corresponding to a subset of the subsets of intervals of the external NRO, wherein each number generated by the internal NRO is logically split to a prefix and a body of the internal NRO with predefined lengths;
        define a set of intervals of numbers generate-able by the internal NRO, based on possible combinations of characters in the prefix of the internal NRO;
        correlate a number associated with the external NRO, within the subset of intervals of the external NRO, with a number generated by the internal NRO, based a value of the prefix of the external NRO and a value of the prefix of the internal NRO; and
        assign the number associated with the external NRO to a document.

2. The system of claim 1, wherein the prefix of the external NRO allows usage of alpha-numeric characters to extend a cardinality of the set of intervals.

3. The system of claim 1, wherein the body of the external NRO allows usage of numeric characters to enable the correlation between the number associated with the external NRO and the number generated by the internal NRO.

4. The system of claim 1, wherein a cardinality of the set of intervals of the numbers generate-able by the internal NRO is limited by possible characters of a second part of the prefix of the external NRO.

5. The system of claim 4, wherein a value of the prefix of the internal NRO for an interval of the set of intervals of the numbers generate-able by the internal NRO corresponds to a value of the second part of the prefix of the external NRO of an interval of the subset of intervals of the external NRO.

6. The system of claim 5, wherein correlating the number associated with the external NRO with the number generated by the internal NRO comprises:
    assigning the value of the body of the number generated by the internal NRO to the body of the number associated with the external NRO based on the correspondence.

7. The system of claim 1, wherein the number generated by the internal NRO is generated based on a request associated with the document, wherein the request relates to a specific interval of the subset of intervals of the external NRO based on at least one of an entity and a type of the document.

8. A non-transitory computer-readable medium storing instruction, which when executed by a computer cause the computer to perform operations comprising:
    generate an external number range object (NRO) to assign numbers to documents, wherein each number associated with the external NRO is logically split to a prefix and a body of the external NRO with predefined lengths;
    define a set of intervals of numbers associate-able with the external NRO, based on possible combination of characters in the prefix of the external NRO;
    group the set of intervals into subsets of intervals of the external NRO, based on possible combinations of characters in a first part of the prefix of the external NRO;
    generate an internal NRO corresponding to a subset of the subsets of intervals of the external NRO, wherein each number generated by the internal NRO is logically split to a prefix and a body of the internal NRO with predefined lengths:
    define a set of intervals of numbers generate-able by the internal NRO, based on possible combinations of characters in the prefix of the internal NRO;
    correlate a number associated with the external NRO, within the subset of intervals of the external NRO, with a number generated by the internal NRO, based a value of the prefix of the external NRO and a value of the prefix of the internal NRO; and assign the number associated with the external NRO to a document.

9. The non-transitory computer-readable medium of claim 8, wherein the prefix of the external NRO allows usage of alpha-numeric characters to extend a cardinality of the set of intervals, and wherein the body of the external NRO allows usage of numeric characters to enable the correlation between the number associated with the external NRO and the number generated by the internal NRO.

10. The non-transitory computer-readable medium of claim 8, wherein a cardinality of the set of intervals of the numbers generate-able by the internal NRO is limited by possible characters of a second part of the prefix of the external NRO.

11. The non-transitory computer-readable medium of claim 10, wherein a value of the prefix of the internal NRO for an interval of the set of intervals of the numbers generate-able by the internal NRO corresponds to a value of the second part of the prefix of the external NRO of an interval of the subset of intervals of the external NRO.

12. The non-transitory computer-readable medium of claim 11, wherein correlating the number associated with the external NRO with the number generated by the internal NRO comprises:

assigning the value of the body of the number generated by the internal NRO to the body of the number associated with the external NRO based on the correspondence.

13. The non-transitory computer-readable medium of claim 8, wherein the number generated by the internal NRO is generated based on a request associated with the document, wherein the request relates to a specific interval of the subset of intervals of the external NRO based on at least one of an entity and a type of the document.

14. A computer implemented method to provide pseudo internal numbering for unique and continuous numbering of documents generated in a software application, the method comprising:

generating, by a processor of a computer, an external number range object (NRO) to assign numbers to the documents, wherein each number associated with the external NRO is logically split to a prefix and a body of the external NRO with predefined lengths;

defining a set of intervals of numbers associate-able with the external NRO, based on possible combination of characters in the prefix of the external NRO;

grouping the set of intervals into subsets of intervals of the external NRO, based on possible combinations of characters in a first part of the prefix of the external NRO;

generating an internal NRO corresponding to a subset of the subsets of intervals of the external NRO, wherein each number generated by the internal NRO is logically split to a prefix and a body of the internal NRO with predefined lengths;

defining a set of intervals of numbers generate-able by the internal NRO, based on possible combinations of characters in the prefix of the internal NRO;

correlating a number associated with the external NRO, within the subset of intervals of the external NRO, with a number generated by the internal NRO, based a value of the prefix of the external NRO and a value of the prefix of the internal NRO; and assigning, at a memory of the computer, the number associated with the external NRO to a document.

15. The method of claim 14, wherein the prefix of the external NRO allows usage of alpha-numeric characters to extend a cardinality of the set of intervals.

16. The method of claim 14, wherein the body of the external NRO allows usage of numeric characters to enable the correlation between the number associated with the external NRO and the number generated by the internal NRO.

17. The method of claim 14, wherein a cardinality of the set of intervals of the numbers generate-able by the internal NRO is limited by possible characters of a second part of the prefix of the external NRO.

18. The method of claim 17, wherein a value of the prefix of the internal NRO for an interval of the set of intervals of the numbers generate-able by the internal NRO corresponds to a value of the second part of the prefix of the external NRO of an interval of the subset of intervals of the external NRO.

19. The method of claim 18, wherein correlating the number associated with the external NRO with the number generated by the internal NRO comprises:

assigning the value of the body of the number generated by the internal NRO to the body of the number associated with the external NRO based on the correspondence.

20. The method of claim 14, wherein the number generated by the internal NRO is generated based on a request associated with the document, wherein the request relates to a specific interval of the subset of intervals of the external NRO based on at least one of an entity and a type of the document.

* * * * *